No. 758,173. PATENTED APR. 26, 1904.
F. B. COREY.
EMERGENCY BRAKE.
APPLICATION FILED OCT. 14, 1903.
NO MODEL. 3 SHEETS—SHEET 1.
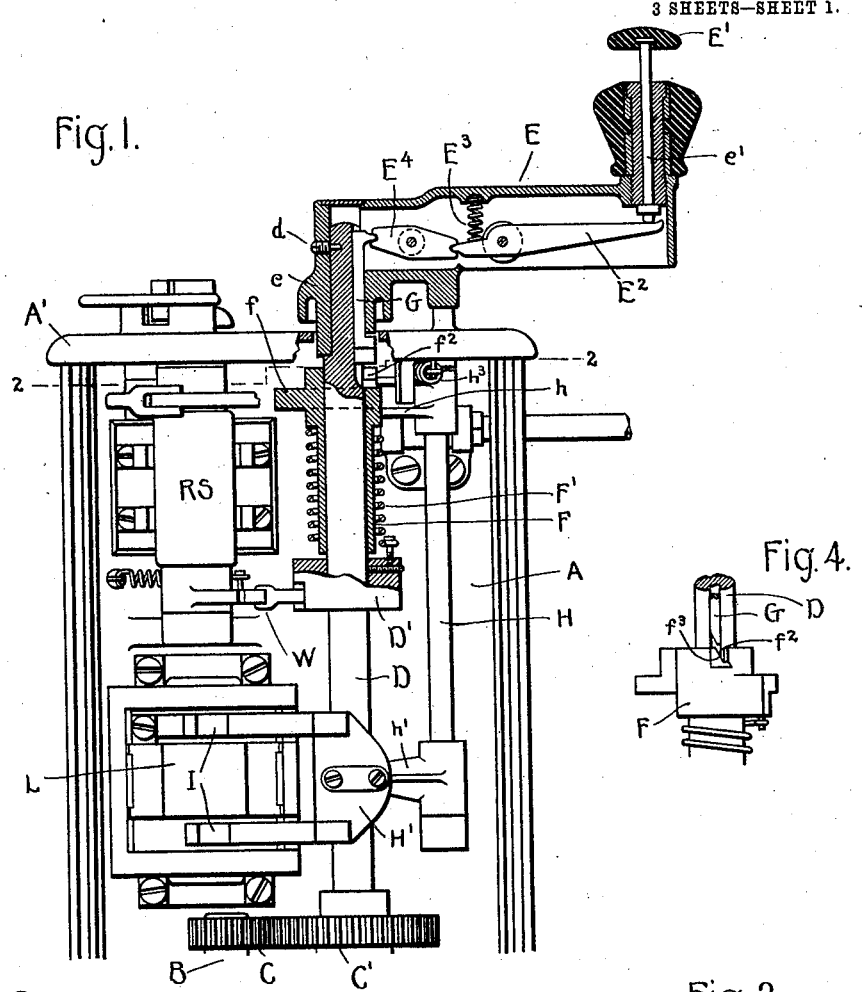
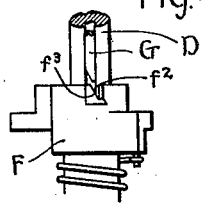
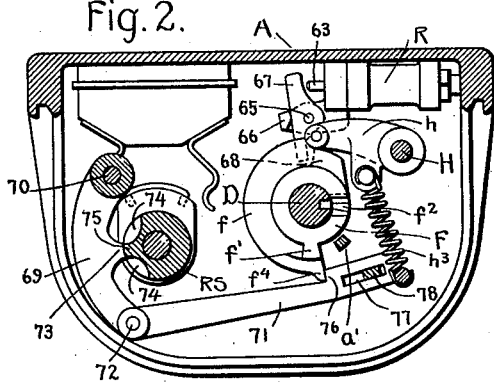
WITNESSES
INVENTOR.
Fred B. Corey.

No. 758,173. PATENTED APR. 26, 1904.
F. B. COREY.
EMERGENCY BRAKE.
APPLICATION FILED OCT. 14, 1903.
NO MODEL. 3 SHEETS—SHEET 2.
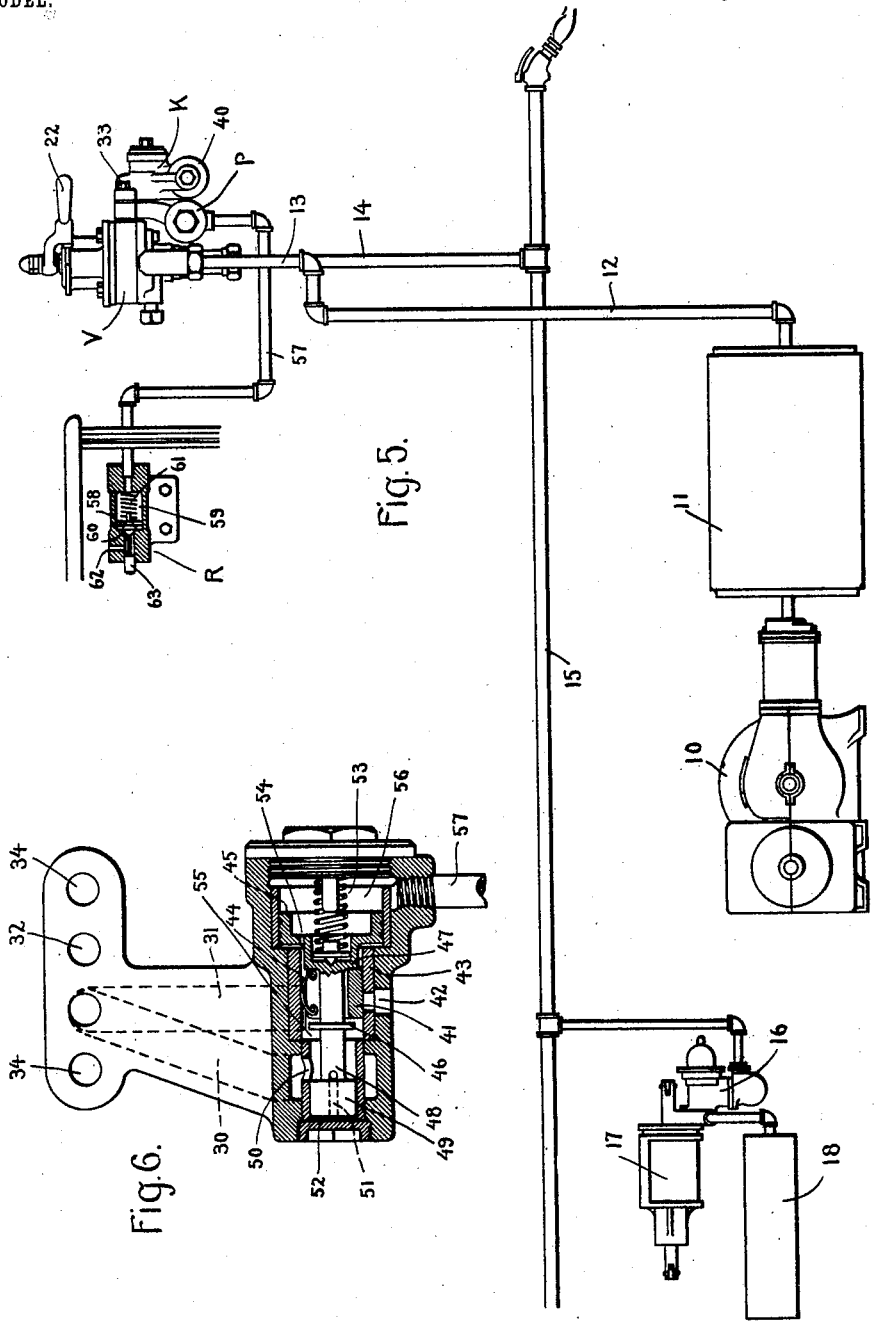
WITNESSES
INVENTOR
Fred B. Corey

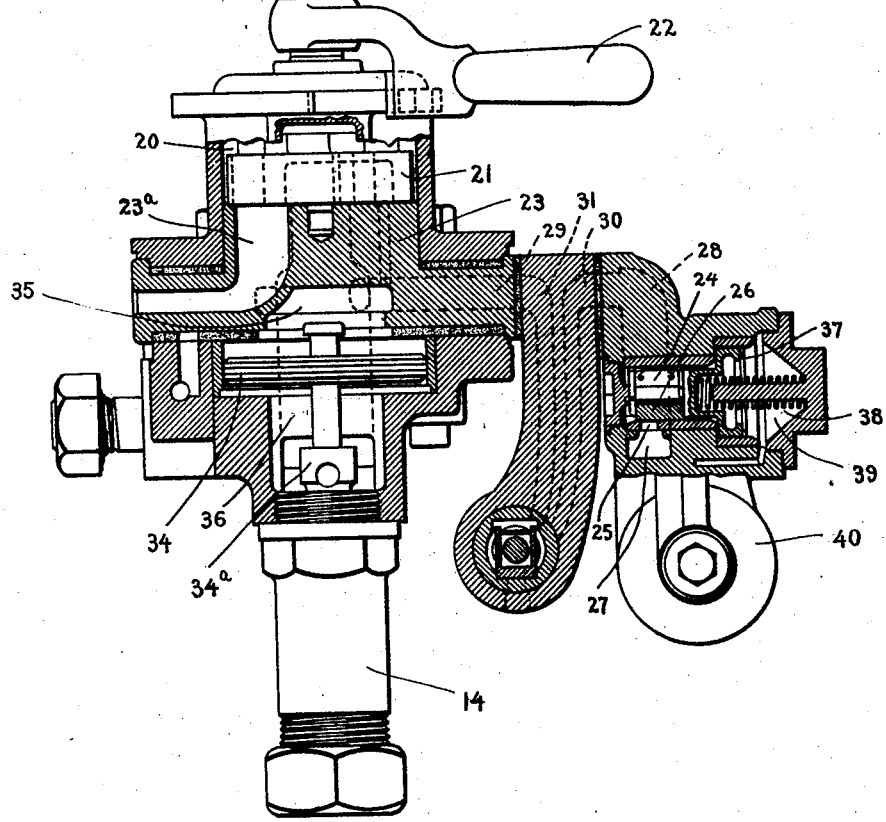

No. 758,173. Patented April 26, 1904.

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

EMERGENCY-BRAKE.

SPECIFICATION forming part of Letters Patent No. 758,173, dated April 26, 1904.

Application filed October 14, 1903. Serial No. 177,048. (No model.)

*To all whom it may concern:*

Be it known that I, FRED B. COREY, a citizen of the United States, residing at Schenectady, in the county of Schenectady, State of New York, have invented certain new and useful Improvements in Emergency-Brakes, of which the following is a specification.

My present invention relates to improvements in means for automatically controlling power-actuated brakes in case of an emergency and is intended for use especially in connection with electrically-propelled vehicles or trains employing a braking system actuated by compressed fluid.

In air-brake systems as commonly applied to electrically-propelled vehicles it is desirable to provide an automatically-actuated valve or other equivalent mechanism which will operate to cause the brakes to be applied in case the motorman or operator becomes incapacitated through sudden illness, death, or any other cause. Emergency-valves which operate automatically to apply the brakes whenever the controlling-handle is released by the operator have been illustrated and described in prior applications—such, for instance, as the application of W. B. Potter, Serial No. 121,277, filed August 28, 1902, and my application, Serial No. 148,902, filed March 21, 1903. My present invention therefore constitutes an improvement on the devices shown and described in the applications above referred to.

The invention hereinafter described is particularly adapted for use in connection with the so-called "automatic" air-brake system—that is, a system in which the train-pipe is exhausted to atmosphere to apply the brakes in contradistinction to the "straight" air-brake system, in which the compressed fluid is supplied to the train-pipe from the source of supply to apply the brakes. In the automatic system it is customary to use in connection with the engineer's or motorman's valve an automatically-actuated feed-valve which maintains the pressure in the train-pipe at a predetermined value while the motorman's valve is in its running position. This insures the maintaining of the brakes in their released position while the train is running and takes care of all leakage of air from the system. If the feed-valve remains in such a position as to connect the main reservoir with the train-pipe at the time the emergency-valve is operated by the releasing of the controlling-handle, there is a possibility of the operation of the emergency-valve being rendered ineffective to apply the brakes quickly, as the air may be supplied to the train-pipe through the feed-valve substantially as rapidly as it can be exhausted from said train-pipe through the emergency-valve. In my prior application above referred to I employed an emergency device which was inserted in the pipe connection between the engineer's valve and the train-pipe, and this valve served to exhaust the train-pipe to atmosphere to apply the brakes in case of an emergency and simultaneously to cut off the communication between the train-pipe and the engineer's valve. Such an arrangement of course rendered the engineer's valve ineffective to control the brakes as long as the communication between the engineer's valve and the train-pipe was cut off.

It is the object of my present invention to so construct and arrange the emergency device that it will be more positive in its action and will not interfere with the connections between the train-pipe and the engineer's valve and at the same time prevent its operation from being rendered ineffective by the compressed air which may be fed into the train-pipe from the source of supply through the feed-valve.

In carrying out my invention I employ an emergency device which is preferably inserted between the engineer's valve and the feed-valve, so as to control the passage-way leading from the feed-valve to the train-pipe, and which is constructed and arranged to exhaust the train-pipe to atmosphere to apply the brakes and simultaneously to cut off the communication between the feed-valve and the train-pipe without obstructing or in any way interfering with the communication between the engineer's valve and the braking devices. This emergency device is preferably controlled by a pilot-valve, which is operated whenever a controlling-handle is released by the motorman.

In the accompanying drawings, which illustrate the preferred embodiment of my invention, Figure 1 is an elevation of a specific form of motor-controller supplied with emergency-device-actuating mechanism, parts of said controller being shown broken away and in section. Fig. 2 is a sectional plan view of the controller and emergency-device-actuating mechanism, taken on the line 2 2 of Fig. 1. Fig. 3 is a sectional plan view similar to Fig. 2, showing the emergency-device-actuating mechanism in the position it assumes after operating the pilot-valve. Fig. 4 is a side elevation showing part of the mechanism operated from the controlling-handle for resetting the emergency-device-actuating mechanism. Fig. 5 is a diagrammatic representation of an automatic air-brake system embodying my invention. Fig. 6 is a vertical section taken longitudinally through the emergency device; and Fig. 7 is a vertical section through the engineer's valve, the emergency device, and a feed-valve, showing the preferred relative position of said emergency device.

Referring now to the drawings, A represents the back of the controller-casing, and E the operating-handle for the controller-cylinder B, mounted within said casing. The controller-cylinder B carries the usual contact-segments and is geared by cog-wheels C and C' to the shaft D, which runs up into the hub $e$ of the operating-handle E, the said hub being rotatable in an opening in the cap-plate A' and fastened to the shaft D by means of a set-screw $d$. Rotatably mounted on the shaft D is a sleeve F, maintained yieldingly in its normal position by means of the helical spring F', which is connected at one end to the sleeve and at the other end to the shaft, preferably by means of the collar D', secured to said shaft. The sleeve F carries a cam $f$ and lug $f'$, Fig. 2, the latter serving as a stop by abutting against a stationary lug $a'$ on the under side of the cap-plate.

Connected with the knob E' in the controlling-handle is a pin $e'$, which rests upon the long arm of a lever $E^2$, fulcrumed on the operating-handle E. A spring $E^3$ bears on the short arm of the lever $E^2$ and keeps the pin and knob normally raised. A toothed rocker $E^4$ also is fulcrumed on the operating-handle and engages with the short arm of the lever $E^2$. The other end of the rocker $E^4$ engages with a lug on the upper end of the bolt G, slidable in a keyway in the shaft D and adapted to enter a notch $f^2$, formed in the upper end of the sleeve F, and acts to lock said sleeve to said shaft. The bolt G will enter the notch $f^2$ whenever the knob E' is depressed, providing the controller is in the "off" position. The sleeve F is adapted to be rotated with the shaft D so long as pressure is maintained on the knob E', on which the palm of the motorman's hand is adapted to rest while the controlling-handle is being operated.

Adjacent to the shaft D within the controller-casing is a rock-shaft H, carrying an arm $h$, which bears against the cam $f$, as is clearly shown in Figs. 2 and 3, whereby a certain movement of said cam will rock the shaft H. The arm $h$ is held against said cam by the spring $h^3$. Also mounted on the rock-shaft H is an arm $h'$, carrying a block of insulating material H', on which are mounted two connected spring contact-fingers, which coöperate with stationary contacts, forming therewith a double-pole switch I for closing and opening the power-circuit when the shaft H is rocked. The insulating-casing containing the blow-out coil for the switch I is indicated by L. The reversing-switch RS is of the type used in connection with master-controllers in train-control systems which employ motor-controllers of the separately-actuated contact type. The customary interlocking mechanism between said reversing-switch and the shaft D is indicated by W.

Mounted within the controller-casing and operatively connected to the emergency device, which will be hereinafter described, is a pilot-valve, which is adapted to cause said emergency device to operate to apply the brakes in case the controlling-handle is released by the operator.

Referring now to Fig. 5, which illustrates diagrammatically an automatic air-brake system, the main storage-reservoir 11 is connected to the train-pipe 15 through the engineer's valve V, feed-valve K, and the emergency device P, communication being had through the connecting-pipes 12, 13, and 14. The pressure in the main reservoir 11 is maintained practically constant by means of the motor-driven air-compressor 10. Also connected with the train-pipe 15 is a triple valve 16, which controls the communication between the auxiliary reservoir 18 and the brake-cylinder 17 and also between said auxiliary reservoir and train-pipe 15 in a manner well understood by those familiar with automatic air-brake systems.

The engineer's or motorman's valve V may be of the customary type which controls the admission of compressed fluid from the source of supply to the train-pipe and also the exhaust from the train-pipe to atmosphere through wide and restricted passage-ways. I have chosen to illustrate my invention in connection with one of the latest forms of Westinghouse engineers' valves equipped with a feed-valve. This valve will be hereinafter briefly described, and for a further and more detailed description reference may be had to the patent to Mason, No. 718,491, granted January 13, 1903. My invention is equally applicable to other forms of engineers' valves equipped with a feed-valve—such, for instance, as that shown and described in the patent to Westinghouse and Welsh, No. 561,949, granted June 9, 1896.

In Fig. 7 the engineer's valve is shown in its running position. This is the proper position of the engineer's valve when the car or train is running and the braking apparatus is charged and ready for an application. The rotary valve 21, controlled by the operating-handle 22, has ports and passage-ways formed therein which coöperate with ports and passage-ways in the valve-body 23 to control the admission of compressed air to the pipe 14, leading to the train-pipe, and the exhaust of the air from said train-pipe through exhaust-passage-way $23^a$. The said rotary valve, furthermore, controls the operation of the exhaust-valve $34^a$, which is connected with the equalizing-piston 34, the latter being subjected to the pressure within the chamber 35, leading to the equalizing-reservoir and to the pressure within the chamber 36, which is in communication with the train-pipe. The specific form of feed-valve shown comprises a supply-valve 26, attached to the piston 37, which is actuated by compressed fluid and also by the spring 38. The admission of compressed fluid to the chamber 39 behind the piston 37 is controlled by a regulating-valve contained within the casing 40. In the running position of the engineer's valve the compressed fluid from the main reservoir, which is in direct communication with the chamber 20 above the rotary valve 21, is conducted by a port in said rotary valve and passages in the valve-seat 23 into the chamber 24 in the feed-valve K. Passing from said chamber 24 the air flows through the port 25, controlled by the slide-valve 26, into the chamber 27, which is in communication with the passage-way 28. Normally without the emergency device in position said passage-way 28 would be in register with the passage-way 29 in the engineer's-valve seat, said passage-way being in communication with the train-pipe. My improved emergency device, however, is inserted between the feed-valve and the engineer's valve in such a manner that the passage-way 30 in the emergency-device casing is in register with the passage-way 28, leading from the feed-valve, while the passage-way 31 in said emergency-device casing is in register with the passage-way 29 in the engineer's valve. Compressed fluid in passing to the train-pipe from the feed-valve is therefore compelled to pass through the emergency device; but in passing from the source of supply through the engineer's valve to the feed-valve it flows through the proper passage-ways in the engineer's valve and feed-valve (not shown) and the direct passage-way 32, formed in the upper part of the emergency-device casing. The feed-valve and emergency-device casing are fastened to the engineer's valve by means of the bolts 33, Fig. 5, the said bolts passing through the openings 34, formed through ears attached to said emergency-device casing. It is not considered necessary to go into the details of operation of the different parts of the engineer's valve or of the feed-valve, as these form no part of my present invention and are clearly described in the patents above referred to.

The casing of the emergency device P contains a slide-valve 41, which controls the exhaust-port 42 and operates to connect the passage-way 31, which is in communication with the train-pipe, to the atmosphere to exhaust said train-pipe. The said valve 41 is yieldingly maintained upon its seat 43 by means of the spring 44 and is operatively connected with the actuating-piston 45, being constrained to move longitudinally on its seat when said piston is moved by means of the collar 46 and shoulder 47, formed on the piston-rod 48, attached to said piston 45. Formed on the end of said piston-ron 48 or otherwise attached thereto is a valve 49, which is adapted to control the port 50, leading to the passage-way 30, which is in communication with the source of compressed-fluid supply through the feed-valve and engineer's valve. The valve 49 is provided with a passage-way 51, which allows the pressure on both sides of said valve 49 to be equalized to prevent any cushioning action between the said valve and the end 52 of the valve-casing. The valves 41 and 49 are maintained in the position shown normally by means of the spring 53, it being understood that the pressure on both sides of the piston 45 is equalized through the small passage-way 54, formed in said piston—that is to say, the pressure in the chamber 55 is normally equal to the pressure in the chamber 56. With said valves in their normal position, as shown, the passage-way 31 is in direct communication with the passage-way 30 through the chamber 55, so that the compressed fluid has an uninterrupted passage-way directly from the feed-valve to the train-pipe; but when the emergency-valves are moved to the right, compressing the spring 53, the valve 49 acts to close the port 50, thus cutting off communication between the passage-way 30 and the passage-way 31, and at the same time the slide-valve 41 operates to open communication between the passage-way 31 and the atmosphere through the exhaust-port 42, thus exhausting the train-pipe to atmosphere. This is accomplished whenever the air in the chamber 56 is suddenly exhausted.

The chamber 56 of the emergency device is connected with the pilot-valve within the controller-casing by means of the pipe 57. The said pilot-valve, the casing of which is indicated by R, comprises a small spring-pressed valve 58, which operates in the chamber 59 and is maintained upon its seat 60 by means of the spring 61. The said valve controls the opening 62, leading to atmosphere, and is itself operated through the agency of the valve-spindle 63, which extends through the end of the valve-casing R. The mechanism for operating the pilot-valve will now be described. Pivotally mounted at 65 on the bracket 66, attached to the controller-casing or to the pilot-valve casing, is a lever 67, one end of which is adapted to impinge the valve-spindle 63 and the other end of which lies in the path of a projection or lug 68, formed on the under side of the cam $f$. The projection 68 is adapted to strike the lever 67, so as to cause the pilot-valve 58 to open whenever the controlling-handle is released by the operator, provided the reversing-switch RS is in one or the other of its operative positions. The controller is provided with means whereby the lug 68 may be held out of engagement with the lever 67 and locked in such a position when the reversing-switch is in its neutral position. The said means which renders the emergency-valve inoperative at the time the handle is released by the operator comprises a lever-arm 69, pivoted to the cap-plate A' at 70, and a link 71, pivoted to the arm 69 at 72. The lever-arm 69 has formed thereon a projection 73, adapted to engage the recesses 74 and the projection 75, which are formed on the reversing-switch cylinder. The recesses 74 correspond to the operative positions of the reversing-switch. The link 71 has formed at its outer end a shoulder 76 and a slot 77. The shoulder 76 is adapted to engage a projection or lug $f^4$, formed on the cam $f$, and the slot 77 coacts with the fixed pin 78, integrally formed with or otherwise attached to the cap-plate A' to form a guide for the reciprocable link 71.

As will be clearly seen by referring to Fig. 4, one side $f^3$ of the notch $f^2$, formed in the upper end of the sleeve F, is inclined in such a manner that as the bolt G, which is beveled at its lower end, is forced into said notch the sleeve F is rotated about the shaft D and is moved from the position shown in Fig. 3 to the position shown in Fig. 2. This is accomplished by depressing the knob E' in the controlling-handle after the said handle has been brought back to its off position.

In the operation of the controller and emergency device when the motorman places his hand on the operating-handle E he depresses the push-pin $e'$ and forces the bolt G down into the notch $f^2$ in the sleeve F, thereby locking the sleeve to the shaft D. The rotation of the handle operates first to close the cut-out switch I by operating the rock-shaft H through the agency of the sleeve F and the cam $f$ and then to control the motor-circuits by means of the controlling-cylinder B. With the operating-handle in its off position and the reversing-switch in its neutral position the emergency-valve-actuating mechanism is in the position shown in Fig. 2, the lever 67 being out of engagement with or slightly resting against the end of the valve-spindle 63. When the reversing-switch is thrown into one of its operative positions and the handle E is moved forward after depressing the knob E', the sleeve F is rotated with the shaft D and the projection 68 is moved away from the lever 67 and the lug or projection $f^4$ is moved out of engagement with the shoulder 76. If now the motorman removes his hand from the operating-handle, the sleeve F is unlocked and the spring F' instantly turns the said sleeve backward until the lug $f'$ strikes the stop $a'$ on the cap-plate, as shown in Fig. 3. In this position of the sleeve the projection 68 engages with one arm of the lever 67 and forces the other arm of said lever into engagement with the valve-spindle 63, thereby opening the pilot-valve 58, which in turn causes the compressed fluid in the chamber 56 of the emergency-valve to be exhausted to atmosphere through the port 62. The compressed fluid in the chamber 55 then forces the piston 45 to the right, causing the valve 41 to open communication between the train-pipe and atmosphere and causing the valve 49 to cut off the communication between the feed-valve and the train-pipe, as has been heretofore described. Simultaneously with the operation of the emergency device the cam $f$ allows the cut-out switch I to be thrown open by means of the spring $h^3$. The air-brakes are therefore suddenly applied, and the power-circuit is opened. While the train-pipe 15 is being exhausted through the exhaust-port 42, the feed-valve, and consequently the source of compressed-fluid supply, is cut off from the train-pipe, so that the compressed fluid is prevented from passing into the train-pipe through the engineer's valve and feed-valve. There is thus no danger of the pressure in the train-pipe being maintained by compressed air supplied through the feed-valve, and the triple valve 16 therefore operates to apply the brakes when the train-pipe is connected to atmosphere through the emergency device.

In order to release the brakes without operating the engineer's or motorman's valve after the said brakes have been applied by the operation of the emergency device and also to reset the emergency-device-actuating mechanism, it is merely necessary to turn the controlling-handle back to its initial or off position and depress the knob E', so as to force the lower end of the bolt G into engagement with the inclined side $f^3$ of the slot $f^2$, thereby rotating the sleeve F about the shaft D and moving the projection 68 away from the lever 67. The pilot-valve 58 is thus allowed to close under the action of the spring 59, and as the pressures on opposite sides of the piston 45 in the emergency-device casing are almost instantly equalized the spring 53 moves the valve 41 to cut off the communication between the train-pipe and atmosphere and also moves the valve 49 to uncover the port 50. The source of supply through the feed-valve is therefore again connected to the train-pipe, and the pressure in the train-pipe 15 is raised to a degree sufficient to cause the triple valve to operate to exhaust the brake-cylinder 17 and release the brakes.

By locating the emergency device in the preferred position between the engineer's valve and the feed-valve, thereby forming the engineer's valve, the feed-valve, and the emergency device into one compact structure, I do not obstruct or in any way interfere with the connections between the engineer's valve and the train-pipe.

The specific construction of the working parts of the motor-controller herein shown and described forms no part of my present invention and is not claimed herein, since it forms the subject-matter of a copending application of Frank E. Case, Serial No. 75,488, filed September 16, 1901. It is merely illustrated and described here to show more clearly how my invention may be applied to the type of master-controller generally employed in train-control systems. It will be readily understood, however, that the invention is not limited in its application to any specific type of motor-controller or system of motor control.

I aim to cover in the claims hereto appended all modifications which do not involve a departure from the spirit and scope of my invention.

What I claim as new, and desire to secure by Letters Patent of the United States, is—

1. In combination, an automatic air-brake system, an engineer's valve, a source of compressed-fluid supply, and an emergency device constructed and arranged to connect the train-pipe of said system to atmosphere to apply the brakes and simultaneously to cut off communication between the train-pipe and the source of supply without interfering with the connections between the engineer's valve and the braking devices of the system.

2. In combination, an automatic air-brake system, an engineer's valve, a source of compressed-fluid supply, an emergency device constructed and arranged to connect the train-pipe of said system to atmosphere to apply the brakes and simultaneously to cut off communication between the train-pipe and the source of supply without interfering with the communication between the engineer's valve and the train-pipe, and means for operating said emergency device.

3. In combination, an automatic air-brake system, an engineer's valve provided with a feed-valve for maintaining the pressure in the train-pipe of said system, an emergency device constructed and arranged to connect the train-pipe to atmosphere to apply the brakes and simultaneously to cut off communication between the feed-valve and the engineer's valve without interfering with the connections between the train-pipe and the engineer's valve.

4. In combination, an automatic air-brake system, an engineer's valve provided with a feed-valve for maintaining the pressure in the train-pipe of said system, an emergency device constructed and arranged to exhaust the train-pipe so as to apply the brakes and also to cut off communication between the feed-valve and the train-pipe without interfering with the communication between the engineer's valve and the train-pipe, and means for operating said emergency device.

5. In combination, an automatic air-brake system, an engineer's valve for controlling the application and release of the brakes of said system, a feed-valve for automatically maintaining the pressure in the train-pipe when the engineer's valve is in its running position, and an emergency device located between the engineer's valve and the feed-valve so as to control the passage-way leading from the feed-valve to the train-pipe, said emergency device being adapted to open said passage-way to the atmosphere to apply the brakes in case of an emergency and at the same time cut off the communication between said passage-way and the feed-valve.

6. In combination, an automatic air-brake system, an engineer's valve for controlling the application and release of the brakes of said system, a feed-valve for automatically maintaining the pressure in the train-pipe when the engineer's valve is in its running position, an emergency device constructed and arranged to open communication between the train-pipe and the atmosphere and at the same time cut off communication between the feed-valve and the train-pipe without interfering with the communication between the train-pipe and the engineer's valve, a controlling-handle, and means for operating said emergency device when the controlling-handle is released by the operator.

7. In combination, an automatic air-brake system, an engineer's valve for controlling the application and release of the brakes of said system, a feed-valve for automatically maintaining the pressure in the train-pipe when the engineer's valve is in its running position, an emergency device constructed and arranged to open communication between the train-pipe and the atmosphere and at the same time to cut off communication between the feed-valve and the train-pipe without interfering with the communication between the train-pipe and the engineer's valve, a motor-controller, a controlling-handle therefor, and means for operating said emergency device when said controlling-handle is released by the operator.

8. In combination, an automatic air-brake system, an engineer's valve for controlling the application and release of the brakes of said system, a feed-valve for automatically maintaining the pressure in the train-pipe when the engineer's valve is in its running position, an emergency device constructed and arranged to open communication between the train-pipe and the atmosphere and at the same time cut off communication between the feed-valve and the engineer's valve without interfering with the connections between the engineer's valve and the braking devices, a motor-controller, an operating-handle therefor, a pilot-valve operatively connected with said emergency device, and means for operating said pilot-valve to cause the operation of the emergency device when said operating-handle is released by the operator.

In witness whereof I have hereunto set my hand this 13th day of October, 1903.

FRED B. COREY.

Witnesses:
 BENJAMIN B. HULL,
 HELEN ORFORD.